(12) United States Patent
Ford

(10) Patent No.: US 9,223,939 B2
(45) Date of Patent: Dec. 29, 2015

(54) KEY GENERATION METHOD

(71) Applicant: Ryan Ford, Santa Monica, CA (US)

(72) Inventor: Ryan Ford, Santa Monica, CA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 0 days.

(21) Appl. No.: 13/649,474

(22) Filed: Oct. 11, 2012

(65) Prior Publication Data

US 2014/0108816 A1    Apr. 17, 2014

(51) Int. Cl.
*G06F 21/10* (2013.01)
(52) U.S. Cl.
CPC ...................... *G06F 21/10* (2013.01)

(58) Field of Classification Search
CPC ...................................................... G06F 21/10
See application file for complete search history.

(56) References Cited

U.S. PATENT DOCUMENTS 7,940,935 B2 * 5/2011 Nakahara et al. .............. 380/278
2005/0015343 A1 * 1/2005 Nagai et al. .................... 705/59

* cited by examiner

*Primary Examiner* — Samson Lemma
*Assistant Examiner* — Simon Kanaan
(74) *Attorney, Agent, or Firm* — Klein, O'Neill & Singh, LLP

(57) ABSTRACT

A computer-implemented method to generate a key to provide access to a software product, where the product key is embedded with product information, such as product title, distribution channel, geographic region of sale or other product data.

14 Claims, 5 Drawing Sheets

KEY GENERATION METHOD

BACKGROUND OF THE INVENTION

This disclosure relates to data security and cryptography and key generation.

Key generation is the process of generating keys for use in various software related applications, such as cryptography, unlocking access to software, redeeming content (e.g. pursuant to a promotion), or in conjunction with a digital rights management system. A key may be used to access whatever data is being protected, such as software or access to a video game. Keys are often used in connection with the distribution of software, where a unique key is included with the software so that only a legitimate buyer of the software can access the functionality of the software.

Keys are generally comprised of a numerical value, which may represent a numeric. alphanumeric, or other symbolic value. In some cases keys are randomly generated using a random number generator (RNG) or pseudorandom number generator (PRNG). A PRNG is a computer algorithm that produces data that appears random under analysis. In other situations. the key is created using a passphrase and a key generation algorithm, usually involving a cryptographic hash function such as SHA-1.

Unfortunately, the key does not contain any built-in information about the product or its distribution channel. Rather, the keys are often generated based on randomly generated numbers and require databases of these keys to provide information about the source of the product associated with any particular key.

BRIEF SUMMARY OF THE INVENTION

In some aspects, the invention provides for the generation of keys that contain information uniquely identifying the product, distribution channel, geographic source of the product, or other identifying or marketing information about the product within the key. In various embodiments such a key generation technique would allow the distributor of the software to readily identify the product, distribution channel and initial geographic sale of the product if a key published or otherwise compromised and would help facilitate efforts to stop further compromising of the protected software code. Embedding such information within the key could also help in gathering of market data by helping to track activation of software by specific geographic region and sales channels.

In one aspect the invention provides a computer enabled method to generate a key to provide access to software, the method comprising: assigning one or more bit values uniquely identifying a product title; combining said assigned one or more bit values with a randomly generated number; encrypting said combination to generate an encrypted key; and mapping said encrypted key to an alphanumeric string.

In another aspect the invention provides a computer-implemented method to generate a key to provide access to a software product, the method comprising: assigning one or more bit values uniquely identifying said software product; assigning one or more bit values identifying a distribution channel for said software product; combining said bit values identifying said product software with said bit values identifying said distribution channel to generate a combined one or more bit values; randomly generating a number comprising one or more bits; combining said randomly generated number with said combined one or more bit values to generate a second combined one or more bit values; encrypting said second combined one or more bit values to generate an encrypted key; and mapping said encrypted key to an alphanumeric string.

In another aspect the invention provides a system useful with respect to product activation keys, comprising: one or more computers configured by program instructions to combine information of a randomly generated number with information relating to a product, to encrypt the combined information, to map the encrypted combined information to an alphanumeric string, and to place information of the mapped encrypted combined information on a medium.

In another aspect the invention provides a method useful with respect to product activation, comprising: combining information based on a randomly generated number with information relating to a product using a computer; encrypting the combined information using a computer; placing information of the encrypted combined information in human readable format on a tangible medium; and packaging the tangible medium with the product.

The present approach can be combined with existing solutions to improve the overall security of a content distribution system such as a DRM (Digital Rights Management) system. Indeed, one can still for instance make the check (test) using classical obfuscation techniques and combine this with the present approach.

These and other aspects are more fully comprehended upon review of this disclosure.

DETAILED DESCRIPTION

Figure 1:
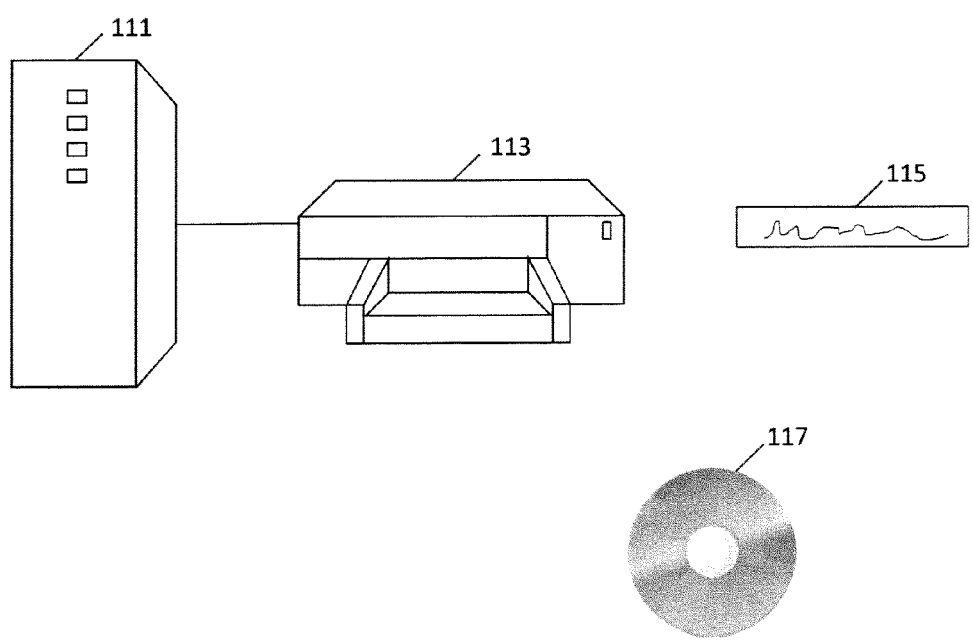
FIG. 1 illustrates a system in accordance with aspects of the invention.

FIG. 1 illustrates a system in accordance with aspects of the invention. In FIG. 1, a computer, generally including one or more processors configured by program instructions. generates cryptographic keys. The cryptographic keys may be product activation keys. If the keys are not in human readable form, in some embodiments the computer determines human readable forms for the keys, for example by mapping the keys to an alphanumeric string. The keys are printed in readable form by a printer 113 to provide a key carrier 115. In various embodiments the printer may print the keys on paper or the like, or the printer may print or imprint or etch the key on some other material, for example plastic or packaging associated with a product. The key carrier is included with a product, for example a software product such as a video game on a CD or DVD 115.

The computer will generally include in its memory, or in memory accessible to the computer, information relating to the product with which the key, for example a product activation key, will be used. The information may include one, several, or all of a product title, a product stock keeping unit (SKU), a distribution channel for the product, an intended geographic point of sale of the product, or other information relating to the product.

The computer generates the product activation key using a randomly generated number and the information relating to the product. In some embodiments the computer combines bits representative of the randomly generated number and bits representative of the information relating to the product. In some combinations the bits representative of the information relating to the product are appended or pre-pended to the bits representative of the random number. The computer in most embodiments encrypts the combined value, and maps or transforms the combined value into an alphanumeric sequence.

The computer, which may be one computer or a plurality of different computers. commands the printer to print the alphanumeric sequence, for example for inclusion with a product or product packaging. In various embodiments the printer may print the alphanumeric sequence on paper or the like, or the printer may in some embodiments etch the alphanumeric sequence onto a product carrier or packaging, or item to be included with a product.

Figure 2:
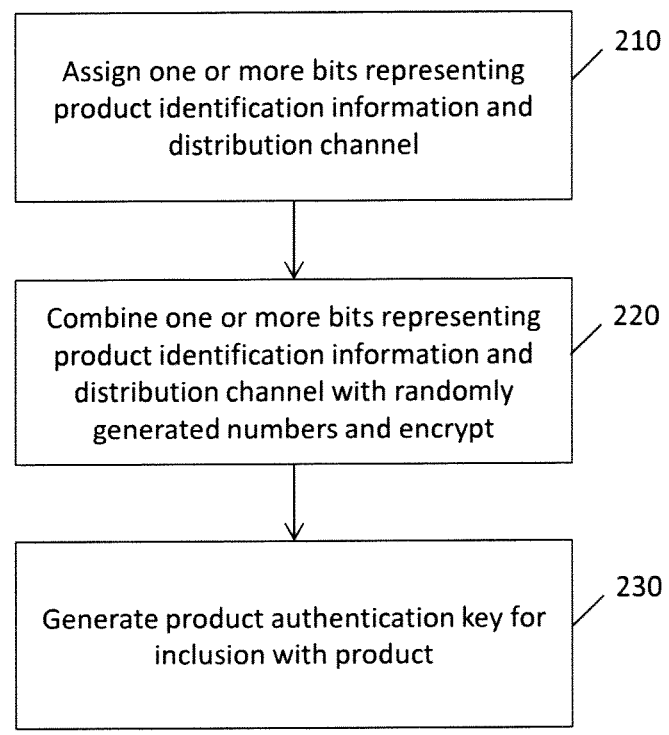
FIG. 2 shows a flow diagram of a process performed by a secure session key generation system realized in accordance with the principles of the present invention.

FIG. 2 shows a flow diagram of a process performed by a secure session key generation system realized in accordance with the principles of the present invention. In various embodiments the process may be performed by the system of FIG. 1. In block 210, one or more bits are assigned to provide a unique identification of one or more of the following parameters describing the product: (1) the product title; (2) the product stock keeping unit (SKU); (3) the distribution channel; and (4) the intended geographic point of sale of the product. Other product parameters, characteristics or information about the products could also be contemplated and assigned a unique numerical value.

In block 220, the one or more bits providing a unique identification of the product parameters are combined with a randomly generated number using known encryption and hashing techniques. These techniques may include combining the bits assigned in 210 with one or more randomly generated numbers, using for example an SH1 hashing technique. This may be performed multiple times and the results of each of these may be encrypted using various techniques, such as DES or AES.

In block 230, the encrypted key is modified and mapped to an alphanumeric string that is human readable. This alphanumeric string is included with the software product so that the purchaser of the software may enter the string to gain access to the software.

If the unique key is hacked, published or otherwise compromised such that users attempting to access the software who have not purchased a legitimate copy of the software, the distributor of the software will be able to decrypt the key to determine the product information that was included in the one or more bits provided in 210. This information would help identify the source of the compromised key. The information could also provide useful marketing data with respect to effectiveness of distribution channels and geographic trends.

Figure 3:
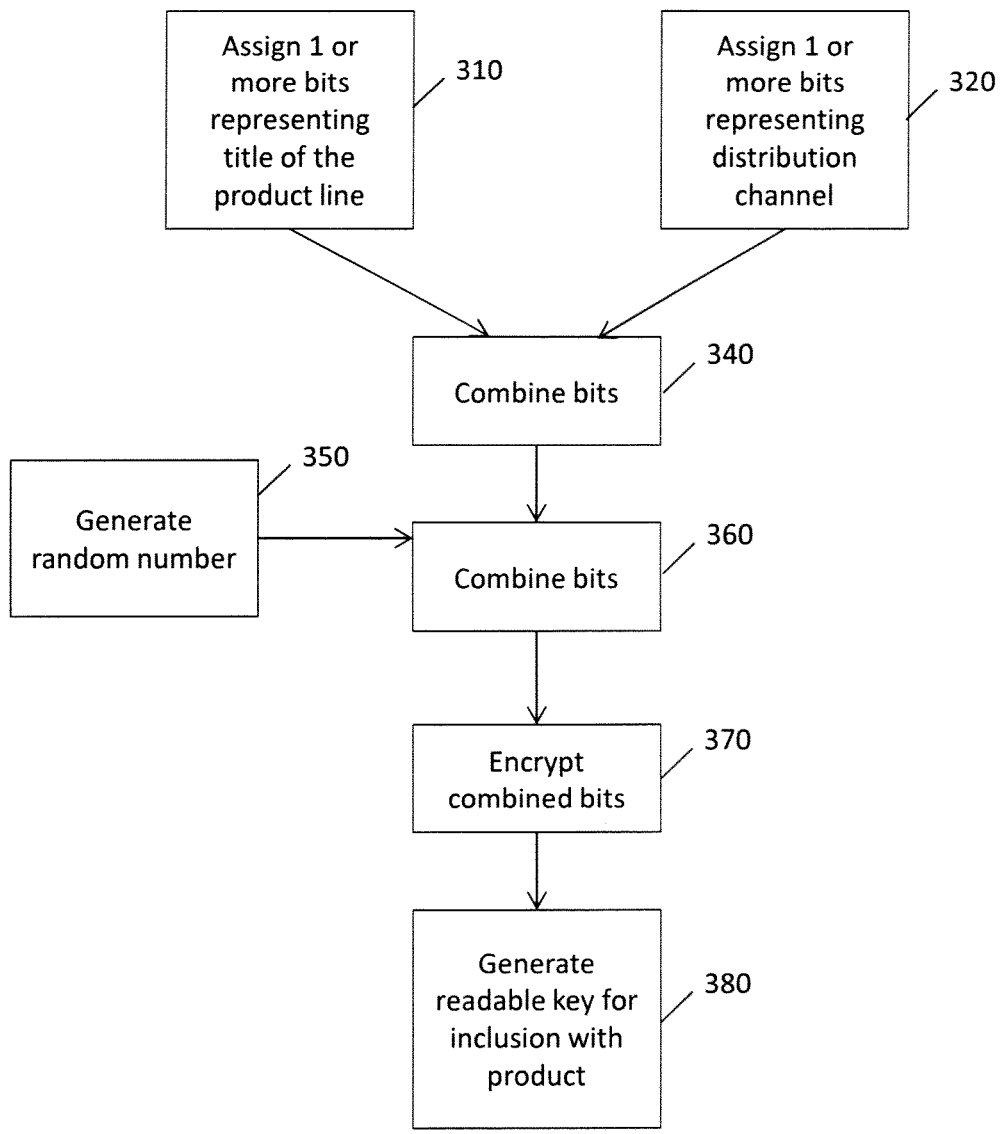
FIG. 3 provides a detailed view of an embodiment of a system consistent with the teachings of the invention disclosed herein.

FIG. 3 provides a detailed view of operation of an embodiment of a system consistent with the teachings of the invention disclosed herein. In block 310, one or more bits are assigned to identify the product line name. For example, the bits "011" could be assigned to identify the software as a Call of Duty®: Black Ops® product. Call of Duty®: Black Ops® is a registered trademark of Activision Publishing, Inc.

In block 320, one or more bits are assigned to identify the distribution channel. For example, the bits "1011" could be assigned to represent that the product is being distributed in Wal-Mart retail stores in Canada.

The bits assigned in blocks 310 and 320 are combined in block 340. The bits may be combined in using a variety of techniques known to those skilled in the art. For example, the bits may simply be appended to one another. In other embodiments, the bits may be hashed with a unique serial number of a randomly generated number.

In block 360, the combined bits of blocks 310 and 320 are combined with a number randomly generated in block 350. The bits may be combined with the number using a variety of techniques known to those skilled in the art. For example, the bits may simply be appended to one another or hashed using, for example, an SH1 technique. The results are then encrypted in block 370.

The encrypted results are then mapped to an alphanumeric string that is included with the product and can be entered by a purchaser of the software to gain access to the software in block 380. For example, the number could be converted into a base 36 string to provide for an alphanumeric code comprising the digits 0-9 and the letters A-Z. In various embodiments other mapping techniques may also be employed utilizing any combination of number bases, alphabets, digits or symbols.

Figure 4:
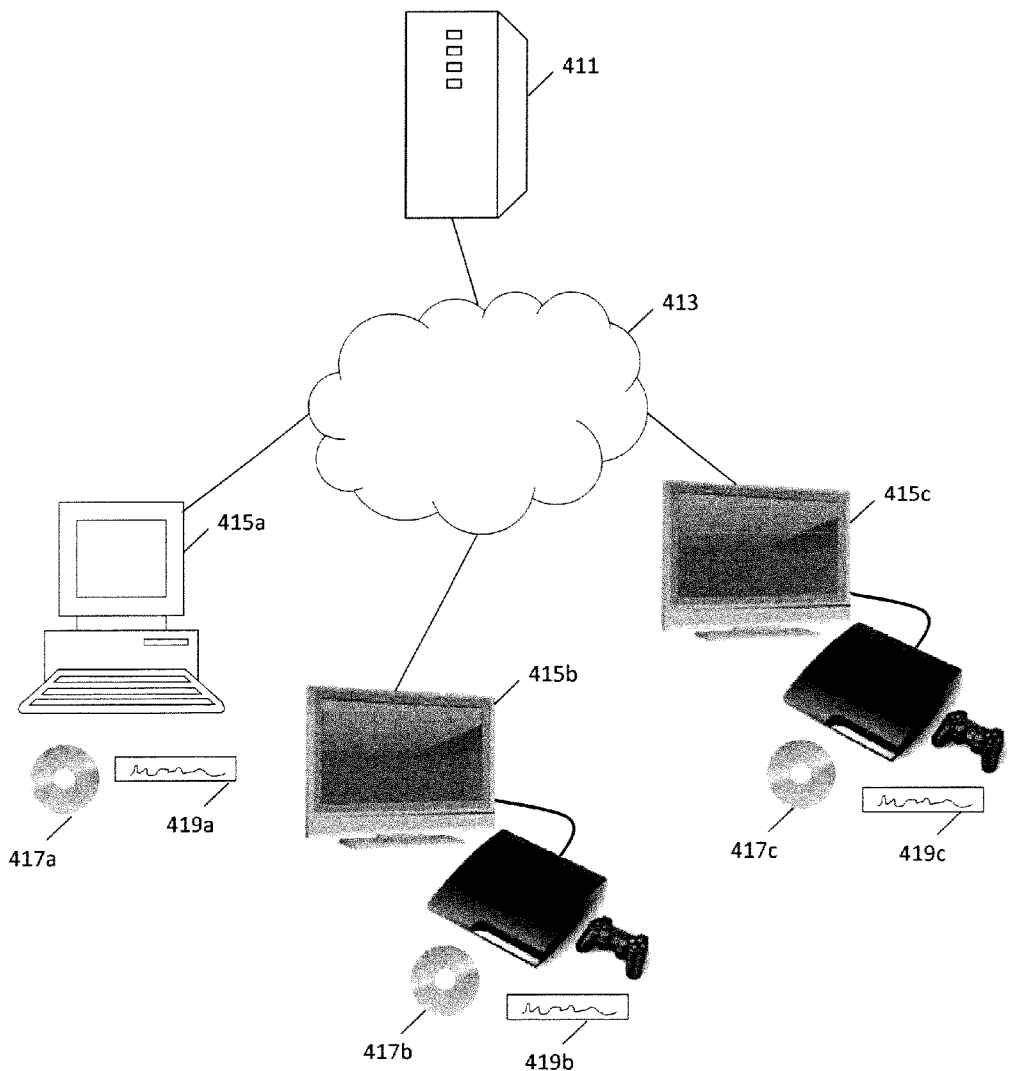
FIG. 4 illustrates a system for utilizing product activation keys.

FIG. 4 illustrates a system utilizing product activation keys. The system includes a computer 411, which for convenience will be termed a server. The computer 411 may, in various embodiments, be comprised of multiple computers, for example on a common network or a plurality of networks, and may have associated memory of various kinds, formats, and capabilities. The server is in communication, over a network 413, for example the Internet, with a plurality of other computers 415a-c. The other computers may be personal computers, for example such as computer 415a, game consoles, for example such as computers 415b-c, or other computer devices. Each of the computers has a software product 417a-c, for example such as a video game, and an associated product activation key 419a-c.

In operation, the computers 415a-c receive the respective product activation keys 419a-c, for example as entered by a user of the respective computers, and the computers transmit the product activation keys over the network to the server. The server processes the product activation keys. The processing may include functions associated with activation of the software products for use on the respective computers.

In various embodiments the processing includes extracting product related information from the product activation keys. In some embodiments the server decrypts the product activation keys, extracts the product related information from the decrypted keys, and stores the product related information in memory. In some embodiments the product related information is stored in a database. In some embodiments the product related information includes a title of the product, a distributor of the product, distribution chain information of the product, and/or intended geographic region of a point of sale of the product. The database may thereafter be accessed to determine, for example, activation related information for the product. including activation by sales by distributor, activation by intended sales region, and a variety of other useful information.

Figure 5:
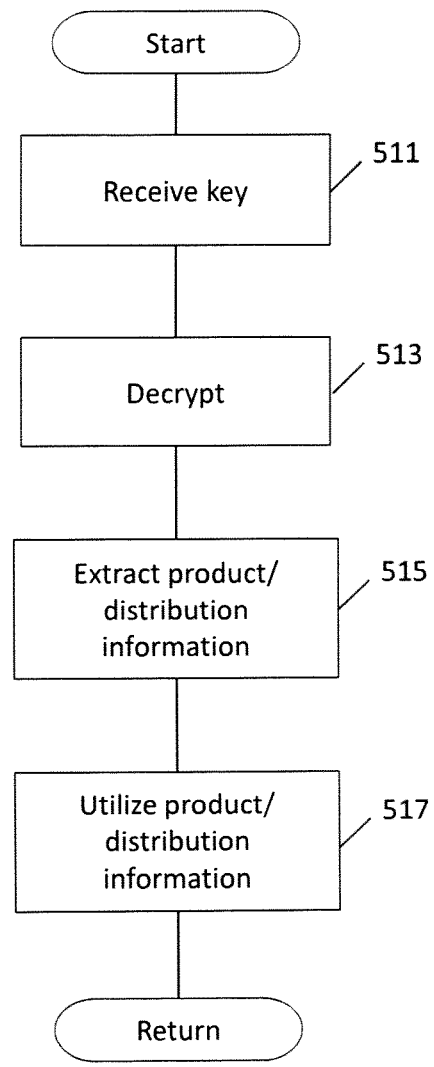
FIG. 5 is a flow diagram of a process utilizing a product activation key in accordance with aspects of the invention.

FIG. 5 is a flow diagram of a process of utilizing a product activation key in accordance with aspects of the invention. The process may be performed, for example, by the server discussed with respect to FIG. 4.

In block 511 the process receives an encrypted product activation key. The key may be received by the server over the Internet, for example. In block 513 the process decrypts the key. In block 515 the process extracts product related information from the decrypted key. The product related information may include information identifying the product or information indicative of distribution of the product. In block 517 the process utilizes the product related information. For example, in some embodiments the process increments a count of product activations for the product. In some embodiments the process increments a count of product activations for a particular chain of distribution. In some embodiments the process increments a count of product activations for an intended sales region of the product.

While the figures show various systems for implementing the key generation techniques described herein, it is understood that additional steps could be added to the process. For example, multiple level of combination with randomly generated numbers could be included. Further, multiple levels of encryption can also be included. This disclosure is illustrative but not limiting; further modifications and embodiments will be apparent to those skilled in the art in light of this disclosure and are intended to fall within the scope of the appended claims.

What is claimed is:

1. A computer enabled method to generate a key to provide access to software, the method comprising:
    assigning one or more bit values uniquely identifying a product title and assigning one or more bit values identifying a geographic region for the product distribution;
    combining said assigned one or more bit values identifying the product title with said assigned one or more bit values identifying a geographic region to generate a first combination;
    randomly generating a number comprising one or more bits;
    combining said first combination with said randomly generated number to generate a second combination;
    encrypting said second combination to generate an encrypted key;
    mapping said encrypted key to an alphanumeric string; and
    placing the alphanumeric string on a tangible medium by a printing device.

2. The method of claim 1, wherein the method further comprises assigning one or more bit values identifying a distribution channel of a product.

3. A computer-implemented method to generate a key to provide access to a software product, the method comprising:
    assigning one or more bit values uniquely identifying said software product;
    assigning one or more bit values identifying a distribution channel for said software product;
    combining said bit values identifying said product software with said bit values identifying said distribution channel to generate a combined one or more bit values;
    randomly generating a number comprising one or more bits;
    combining said randomly generated number with said combined one or more bit values to generate a second combined one or more bit values;
    encrypting said second combined one or more bit values to generate an encrypted key;
    mapping said encrypted key to an alphanumeric string; and
    placing the alphanumeric string on a tangible medium by a printing device.

4. A system for providing product activation keys on a medium, comprising:
    a memory storing a computer program thereon; and
    one or more processors configured by the computer program to:
        receive information relating to a product;
        assign values to at least two items of the information relating to the product;
        combine the assigned values assigned for at least two of the items of the information relating to the product;
        combine information of a randomly generated number with the combined assigned values;
        encrypt the combined information of the randomly generated number and the combined assigned values;
        map the encrypted combined information of the randomly generated number and the combined assigned values to an alphanumeric string; and
        place information of the mapped encrypted combined information on the medium;
    wherein the one or more computers is further configured by program instructions to receive the mapped encrypted combined information, demap and decrypt the mapped encrypted combined information, and extract the information relating to the product from the decrypted mapped encrypted combined information.

5. The system of claim 4, further comprising media indicating the information of the mapped encrypted combined information.

6. The system of claim 5, further comprising the product.

7. The system of claim 6, wherein the product is packaged with the encrypted combined information.

8. The system of claim 4, wherein the encrypting the combined information comprises encrypting the combined information multiple times.

9. A method useful with respect to product activation, comprising:
    combining at least two items of information relating to a product to obtain an item of first combined information;
    combining information based on a randomly generated number with the item of first combined information using a computer to obtain second combined information;
    encrypting the second combined information using a computer;
    placing information of the encrypted second combined information in human readable format on a tangible medium; and
    packaging the tangible medium with the product.

10. The method of claim 9, further comprising mapping the encrypted second combined information to an alphanumeric string, wherein the information of the encrypted second combined information string comprises the alphanumeric string.

11. The method of claim 9, wherein the information relating to the product comprises information indicative of a stock keeping unit (SKU) of the product.

12. The method of claim 9, wherein the information relating to the product comprises information indicative of a title of the product.

13. The method of claim 9, wherein the information relating to the product comprises information indicative of distribution channel for the product.

14. The method of claim 9, wherein the information relating to the product comprises information indicative of an intended geographic region for a point of sale of the product.

* * * * *